US012174868B2

(12) United States Patent
Neumann

(10) Patent No.: US 12,174,868 B2
(45) Date of Patent: Dec. 24, 2024

(54) METHODS AND SYSTEMS FOR DISPLAYING REFRESHMENT OUTLOOKS

(71) Applicant: KPN Innovations, LLC, Lakewood, CO (US)

(72) Inventor: Kenneth Neumann, Lakewood, CO (US)

(73) Assignee: KPN INNOVATIONS, LLC., Lakewood, CO (US)

( * ) Notice: Subject to any disclaimer, the term of this patent is extended or adjusted under 35 U.S.C. 154(b) by 141 days.

(21) Appl. No.: 16/888,261

(22) Filed: May 29, 2020

(65) Prior Publication Data

US 2021/0374165 A1 Dec. 2, 2021

(51) Int. Cl.
*G06F 3/00* (2006.01)
*G06F 3/048* (2013.01)
*G06F 16/335* (2019.01)

(52) U.S. Cl.
CPC ............ *G06F 16/337* (2019.01); *G06F 3/048* (2013.01)

(58) Field of Classification Search
CPC ............................... G06F 16/337; G06F 3/048
See application file for complete search history.

(56) References Cited

U.S. PATENT DOCUMENTS

| | | | |
|---|---|---|---|
| 7,541,548 B1 | 6/2009 | Sze | |
| 8,731,970 B2 | 5/2014 | Hermann et al. | |
| 9,349,297 B1 | 5/2016 | Ortiz et al. | |
| 9,528,972 B2 | 12/2016 | Minvielle | |
| 11,144,957 B1* | 10/2021 | Raak | G06Q 30/0631 |
| 2004/0199545 A1* | 10/2004 | Wagner | B65F 1/1638 |
| 2006/0199155 A1 | 9/2006 | Mosher | |
| 2007/0112597 A1* | 5/2007 | Heckerman | G16H 50/70 705/14.1 |
| 2007/0112598 A1* | 5/2007 | Heckerman | G16H 10/20 705/52 |
| 2007/0118399 A1* | 5/2007 | Avinash | G16H 40/20 705/2 |
| 2008/0086374 A1 | 4/2008 | Aitken | |
| 2008/0235096 A1* | 9/2008 | Owens | G06Q 30/0241 705/14.39 |
| 2008/0275912 A1* | 11/2008 | Roberts | G16B 20/00 |
| 2009/0234839 A1* | 9/2009 | Angell | G06Q 10/04 |
| 2009/0299645 A1* | 12/2009 | Colby | G16H 50/30 506/7 |
| 2010/0042427 A1* | 2/2010 | Graham | G06Q 30/02 705/15 |
| 2010/0136508 A1 | 6/2010 | Zekhtser | |
| 2012/0303638 A1* | 11/2012 | Bousamra | G16H 20/00 707/751 |

(Continued)

*Primary Examiner* — Brett A Feeney
*Assistant Examiner* — Andrew Chung
(74) *Attorney, Agent, or Firm* — Caldwell Intellectual Property Law

(57) ABSTRACT

A system for displaying refreshment outlooks the system comprising a computing device, the computing device designed and configured to retrieve a user profile from a profile database; determine a refreshment position using the user profile; select current refreshment possibilities contained within the refreshment position; output a refreshment target, using the user profile; compare current refreshment possibilities and the refreshment target; and generate a refreshment outlook.

20 Claims, 9 Drawing Sheets

(56) References Cited

U.S. PATENT DOCUMENTS

| | | | |
|---|---|---|---|
| 2013/0091126 A1* | 4/2013 | Krishnaswami | G06F 16/9038 |
| | | | 707/722 |
| 2014/0236759 A1* | 8/2014 | Mirabile | G06Q 30/0633 |
| | | | 705/26.8 |
| 2014/0363797 A1* | 12/2014 | Hu | G09B 5/02 |
| | | | 434/236 |
| 2016/0225284 A1 | 8/2016 | Schoen | |
| 2017/0064989 A1* | 3/2017 | Jolink | C12Y 302/01023 |
| 2017/0193853 A1 | 7/2017 | Byron et al. | |
| 2019/0073601 A1* | 3/2019 | Alkan | G06N 20/00 |
| 2020/0074884 A1 | 3/2020 | Murdoch et al. | |
| 2020/0075153 A1* | 3/2020 | Murdoch | H04W 4/029 |
| 2020/0098466 A1* | 3/2020 | Murdoch | H04W 4/021 |
| 2021/0216920 A1* | 7/2021 | Mimassi | G06F 16/2379 |

* cited by examiner

Graphical User Interface 116

Refreshment Pattern 512

- I eat my meals...
- My typical breakfast...
- Lunch time is at...
- My favorite meal is...
- I wake up at...
- My typical snack is...

*FIG. 5C*

METHODS AND SYSTEMS FOR DISPLAYING REFRESHMENT OUTLOOKS

FIELD OF THE INVENTION

The present invention generally relates to the field of nutrition. In particular, the present invention is directed to methods and systems for displaying refreshment outlooks.

BACKGROUND

Selecting refreshment possibilities that are well tolerated and intended to improve one's wellbeing can be challenging. Frequently, users are overwhelmed by the vast amount of choices and unaware how various choices will affect one's wellbeing. There remains to be seen a way to personalize refreshment possibilities for a user.

SUMMARY OF THE DISCLOSURE

In an aspect, a system for displaying refreshment outlooks the system comprising a computing device, the computing device designed and configured to retrieve a user profile from a profile database, wherein the user profile identifies a refreshment preference; determine a refreshment position using the user profile; evaluate current refreshment possibilities contained within the refreshment position; output a refreshment target, using the user profile; compare current refreshment possibilities and the refreshment target; and generate a refreshment outlook.

In an aspect, a method of displaying refreshment outlooks the method comprising retrieving by a computing device, a user profile from a profile database, wherein the user profile identifies a refreshment preference; determining by the computing device, a refreshment position using the user profile; assessing by the computing device, current refreshment possibilities contained within the refreshment position; calculating by the computing device, a refreshment target, using the user profile; comparing by the computing device, current refreshment possibilities and the refreshment target; and generating by the computing device, a refreshment outlook.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 5A-5C are diagrammatic illustrations of exemplary embodiments of a user self-assessment;

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for displaying refreshment outlooks. In an embodiment, a user profile is utilized to locate and assess refreshment possibilities contained within a specified distance of a user. A computing device calculates a target algorithm to determine a user's refreshment target. Refreshment possibilities are evaluated in view to a user's refreshment target, whereby refreshment possibilities that are deemed to align with a user's refreshment target are selected used to generate a refreshment outlook.

Figure 1:
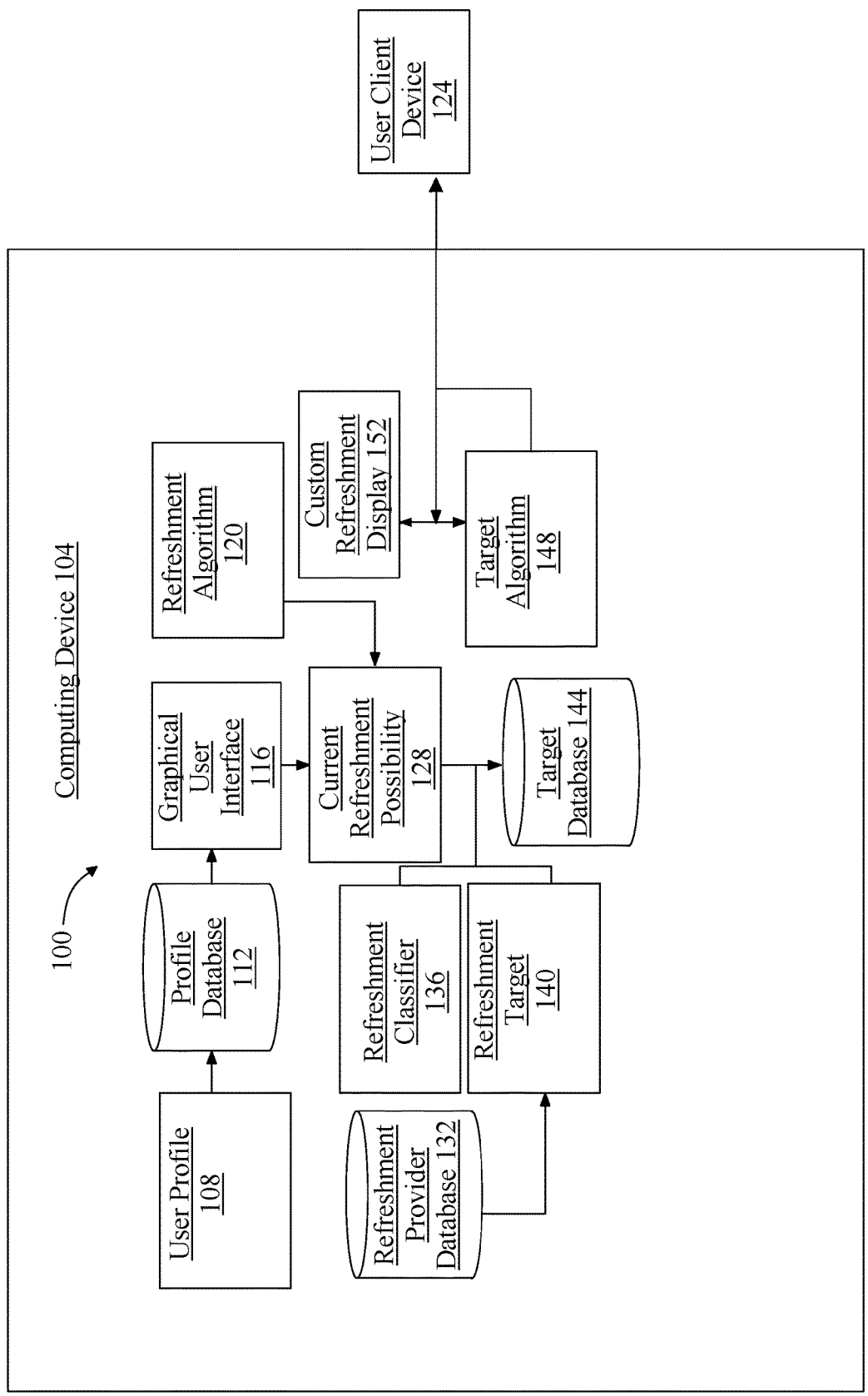
FIG. 1 is a block diagram illustrating an exemplary embodiment of a system for displaying refreshment outlooks.

Referring now to FIG. 1, an exemplary embodiment of a system 100 for displaying refreshment outlooks is illustrated. System 100 includes a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing device 104 operating in concert, in parallel, sequentially or the like; two or more computing devices 104 may be included together in a single computing device 104 or in two or more computing devices 104. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an organization, a building, a campus or other relatively small geographic space), a telephone network, a data network associated with a telephone/voice provider (e.g., a mobile communications provider data and/or voice network), a direct connection between two computing devices 104, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices 104 in a first position and a second computing device 104 or cluster of computing devices 104 in a second position. Computing device 104 may include one or more computing devices 104 dedicated to data storage, security, distribution of traffic for load balancing, and the like. Computing device 104 may distribute one or more computing tasks as described below across a plurality of computing devices 104 of computing device 104, which may operate in parallel, in series, redundantly, or in any other manner used for distribution of tasks or memory between computing devices 104. Computing device 104 may be implemented using a "shared nothing" architecture in which data is cached at the operative, in an embodiment, this may enable scalability of system 100 and/or computing device 104.

Continuing to refer to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence recurrently until a desired or commanded outcome is achieved; repetition of a step or a sequence of steps may be performed iteratively and/or recursively using outputs of previous repetitions as inputs to subsequent repetitions, assembling inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 is configured to retrieve a user profile 108 from a profile database. A "user profile," as used in this disclosure, is a compilation of one or more elements of data relating to a user. Elements of data may relate to demographic information about a user such as a user's full legal name, birthday, annual income, age, marital status, race, gender, occupation, highest achievable educational status, previous job experience, number of offspring, number of siblings, age of mother, age of father, and the like. Elements of data may relate to any self-reported way of eating such as paleo, blood type, vegan, South Beach, Mediterranean, kosher and the like. Elements of data may relate to refreshment preferences that a user has.

With continued reference to FIG. 1, elements of data relating to a user profile 108 may be stored in profile database 112. Profile database 112 may be implemented, without limitation, as a relational database, a key-value retrieval datastore such as a NOSQL database, or any other format or structure for use as a datastore that a person skilled in the art would recognize as suitable upon review of the entirety of this disclosure.

With continued reference to FIG. 1, computing device 104 is configured to generate a user profile 108 using a user self-assessment. A "self-assessment," as used in this disclosure, is an instrument containing a set of one or more prompts for information relating to a user. A self-assessment may include a series of questions containing answers that a user may select. A self-assessment may include a series of questions containing open ended answers that a user may write and/or enter answers into. A self-assessment may include a series of one or more symbols and/or characters that a user may select as an answer. A self-assessment may be displayed on a graphical user interface 116 located on computing device 104. Graphical user interface 116 may include without limitation, a form or other graphical element having display fields, where one or more elements of information may be displayed. Graphical user interface 116 may include sliders or other user commands that may permit a user to indicate a geographical position where the user is currently located and/or where the user will be located in the future. In an embodiment, graphical user interface 116 may display an interactive map, that may allow a user to touch and/or select a geographical position pertaining to the user. Graphical user interface 116 may include free form textual entries, where a user may be able to type in information. For instance and without limitation, graphical user interface 116 may prompt a user for self-assessment such as by displaying a photograph of one or more food items and asking the user to select one or more food items that the user likes to eat. Computing device 104 is configured to identify a refreshment combination preference using a user profile. A "refreshment combination preference," as used in this disclosure, is a suggestion of a refreshment possibility and/or ingredient that a user may like, or dislike based on information contained within a user profile. For instance and without limitation, a refreshment preference contained within a user profile may specify that a user enjoys eating salmon three nights each week. In such an instance, computing device 104 may identify a refreshment combination preference that contains other oily fish a user may like based on a user's like of salmon, including arctic char, ocean trout, amber jack, mackerel, striped bass, and bluefish. In yet another non-limiting example, a refreshment preference contained within a user profile may specify that a user dislikes Brussel sprouts. In such an instance, computing device 104 may identify a refreshment combination preference that identifies other cruciferous vegetables such as cauliflower, cabbage, kale, garden cress, bok Choy, and broccoli. Computing device 104 may display a refreshment combination preference to a user, such as on graphical user interface, to confirm and/or replace any refreshment possibilities and/or ingredients contained within a refreshment combination preference. For instance and without limitation, computing device 104 may generate a refreshment combination preference that contains additional protein choices based on a user's like of chicken, to suggest plant based alternatives such as seitan and tofu. Computing device 104 may display on graphical user interface suggestions contained within a refreshment combination preference, and receive feedback from a user, indicating if a user likes or dislikes seitan and tofu. Such information may be utilized by computing device 104 to examine current refreshment possibilities containing seitan and tofu.

With continued reference to FIG. 1, computing device 104 is configured to generate a refreshment algorithm 120. A "refreshment algorithm," as used in this disclosure, is a mathematical representation of a relationship between inputs and outputs, as generated using any machine-learning process including without limitation any process as described herein, and stored in memory; an input is submitted to a machine-learning model once created, which generates an output based on the relationship that was derived. A refreshment algorithm 120 may be trained using training data. "Training data," as used in this disclosure, is data containing correlations that a machine-learning process including a machine-learning algorithm and/or machine-learning process may use to model relationships between two or more categories of data elements. Training data may be formatted to include labels, for instance by associating data elements with one or more descriptors corresponding to categories of data elements. Training data may not contain labels, where training data may not be formatted to include labels. Training data may be obtained from records of previous iterations of generating refreshment algorithm, user inputs, user questionnaire responses, expert inputs, and the like. A refreshment algorithm 120 may utilize a user profile 108 as an input and output a refreshment preference. A refreshment algorithm 120 may include a supervised machine-learning algorithm that is trained using a set of training data containing labeled inputs and desired outputs. Supervised machine-learning algorithms may include active learning, classification, regression, analytical learning, artificial neural network, backpropagation, boosting, Bayesian statistics, case-based learning, genetic programming, Kernel estimators, naïve Bayes classifiers, maximum entropy classifier, conditional random field, K-nearest neighbor algorithm, support vector machine, random forest, ordinal classification, data pre-processing, statistical relational learning, and the like. A refreshment algorithm 120 may include an unsupervised machine-learning algorithm, that is trained using training data that does not contain data labels. An unsupervised machine-learning algorithm may include a clustering algorithm such as hierarchical clustering, k-means clustering, mixture models, density based spatial clustering of algorithms with noise (DBSCAN), ordering points to identify the clustering structure (OPTICS), anomaly detection such as local outlier factor, neural networks such as autoencoders, deep belief nets, Hebbian learning, generative adversarial networks, self-organizing map, and the like. A refreshment algorithm 120 may include semi-supervised learning that may be trained using training data that contains a mixture of labeled and unlabeled data. A refreshment algorithm 120 may include reinforcement learning, self-learning, feature learning, sparse dictionary learning, anomaly detection, robot learning, association rules, and the like. A refreshment algorithm 120 may include generating one or more machine-learning models. A "machine-learning model," as used in this disclosure, is any mathematical representation of a relationship between inputs and outputs. A machine-learning model an artificial neural network, a decision tree, a support vector machine, regression analysis, Bayesian network, genetic algorithms, and the like.

With continued reference to FIG. 1, a "refreshment preference," as used in this disclosure, is a preference a user has regarding any foods and/or beverages consumed by a human being; a refreshment preference may include any preference a user may have regarding any foods and/or beverages. A refreshment preference may describe any foods a user likes to eat, foods a user does not like to eat, meals a user likes to eat, meals a user does not like to eat, ingredients a user likes to eat, ingredients a user does not like to eat and the like. Elements of data may relate to eating patterns of a user, such as how many meals each day a user eats, times of the day the user usually eats meals, number of snacks a user eats each day, and the like. Elements of data may relate to fiscal amounts, including how much a user spends on average on food, and/or how much a user is willing to spend on food. Elements of data may relate to food preparation preferences, such as how often a user cooks meals at home, eats meals out at a restaurants, orders meals to be delivered, acquires prepared meals from restaurants and/or grocery stores, shops for groceries, orders meal kits, and the like. Elements of data may relate to ingredient standards of foods, such as a user's preference for free range poultry, organically sourced ingredients, grass fed meat, ingredients free of artificial additives and/or preservatives, and the like. Elements of data may relate to logged meal entries, containing a record of one or more meals that a user consumed previously with a timestamp indicating when the meal was consumed, and what was contained in the meal. Elements of data may relate to food source preferences, describing positions of stores, restaurants, food outposts such as prepared food kitchens and/or websites where a user acquires food, meals, and/or ingredients from. Elements of data may relate to physical activity the user engages in, such as any exercise programs, gym, workouts, and/or styles of exercise that a user prefers to engage upon. Elements of data may relate to data indicative of a user's physiological state, including for example a biological extraction. Physiological state may be evaluated with regard to one or more measurements of the physical state of a person's body, one or more systems within a person's body such as a circulatory system, a digestive system, a nervous system, or the like, one or more organs within a person's body, and/or any other subdivision of a person's body useful for diagnostic or prognostic utilization. A biological extraction may include any of the biological extractions as disclosed in U.S. Nonprovisional application Ser. No. 16/659,817, filed on Oct. 22, 2019, and titled "METHODS AND SYSTEMS FOR IDENTIFYING COMPATIBLE MEAL OPTIONS," the entirety of which is incorporated herein by reference.

With continued reference to FIG. 1, computing device 104 is configured to determine a refreshment position using a user profile 108. A "refreshment position," as used in this disclosure, is a geographical locus, which may include any geographical area, that a user visits to purchase and/or acquire refreshments. A refreshment position may be based on a user's normal daily life, including for example positions where a user travels to during the week, such as the position of a user's house, job, gym, and the like. A refreshment position may include the position where a user may feel comfortable traveling to shop for groceries or pick up food from a restaurant. For instance and without limitation, a user who lives in Dallas, Texas may travel to Fort Worth for work each day, and prefer to drive as far North as McKinney, Texas to purchase vegetables grown without pesticides or genetically modified ingredients. A refreshment position may be based on a global positioning system (GPS) of a user. In an embodiment, computing device 104 may receive inputs from a user client device 124 specifying the latitude and longitude of a position where a user is currently located and/or a position where a user may be located in the future. A user client device 124 may include without limitation, a display in communication with computing device 104, where a display may include any display as described herein. A user client device 124 may include an additional computing device, such as a mobile device, laptop, desktop, computer, and the like. Computing device 104 may receive an input from user client device 124 using any network methodology as described herein.

With continued reference to FIG. 1, computing device 104 is configured to select current refreshment possibilities contained within a refreshment position. A "current refreshment possibility," as used in this disclosure, is a meal, including any foods and/or drinks, available for purchase at a refreshment provider within a given temporal range. A current refreshment possibility 128 may include items that can be ordered off a menu at a restaurant such as slow cooked beef stew, red wine braised lamb shank, or a vegetable shepherd's pie available for purchase at an Irish pub located within a refreshment position of a user. A current refreshment possibility 128 may specify meals that may be available at certain times of the day. For instance and without limitation, a diner may serve pancakes, waffles, eggs, and bacon every day from 5 am to 11 am, and then serve turkey club sandwich, tuna melt, chicken salad, and a cheeseburger every day from 12 pm to 9 pm. A current refreshment possibility 128 may specify ingredients contained within different meal offerings, for example a grocery store that sells prepared meals may prepare chicken salad containing diced chicken breast cooked in avocado oil and seasoned with salt and pepper, organic red grapes, toasted organic pecans, and mayonnaise prepared from cage free eggs. A current refreshment possibility 128 may include a description of types of cuisine that a refreshment provider serves, such as American, French, Mediterranean, Middle Eastern, Italian American, Korean, Peruvian, and the like. A current refreshment possibility 128 may include information regarding cooking style of meals, such as if a chicken is roasted in the oven or brushed with canola oil and cooked on a grill pan. A current refreshment possibility 128 may include information regarding nutritional information of refreshment possibilities, such as a breakdown of macronutrients of a refreshment possibility including the amount of protein, carbohydrates, dietary fiber, fat, saturated fat, and the like. A current refreshment possibility 128 may identify ability of a refreshment possibility to be modified to adapt to certain dietary requirements. For example, a refreshment provider that serves sandwiches may indicate what sandwiches can be prepared on gluten free bread to cater to gluten free diets, and what sandwiches can be served in a lettuce wrap to cater to low carbohydrate, paleo, and ketogenic diets. A current refreshment possibility 128 may identify transmission options of current refreshment possibilities. A "transmission option," as used in this disclosure, is a description of any ways in which a refreshment provider conveys refreshment possibilities to a user. A transmission option may detail if a refreshment provider offers delivery to a user, such as delivery to a user's house or job building. A transmission option may detail if a refreshment provider offers dining in options and/or takeout options. A transmission option may detail if a refreshment provider offers advanced ordering, such as orders that can be placed virtually or called in ahead of time. A transmission option may detail the current wait time for a refreshment possibility to be prepared and/or delivered to a user's position. A transmission option may detail if a refreshment provider offers transportation of prepared foods, meals, and/or ingredients that can be send through the mail. Current refreshment possibilities may be stored in refreshment provider database 132. Refreshment provider database 132 may be implemented as any data structure suitable for use as profile database 112 as described above in more detail.

With continued reference to FIG. 1, computing device 104 is configured to receive an input from a refreshment provider identifying current refreshment possibilities. Computing device 104 may receive an input using any network methodology as described herein. Computing device 104 may store one or more inputs from one or more refreshment providers within refreshment provider database 132. Computing device 104 may receive an input from a refreshment provider on a set schedule, such as every morning, as refreshment possibilities may fluctuate based on availability of certain ingredients. Computing device 104 may receive an input from a refreshment provider only when refreshment possibilities are changed. For instance and without limitation, computing device 104 may receive an input from a refreshment provider specifying that an entrée available for dinner that contains miso Chilean sea-bass is not available for the next week, because the refreshment provider is unable to acquire any Chilean sea-bass. In yet another non-limiting example, computing device 104 may receive an input from a refreshment provider specifying that a dish made with salmon and black lentils will be substituted to contain arctic char instead of salmon for the next three days. In yet another non-limiting example, computing device 104 may receive an input from a refreshment provider when new refreshment possibilities are offered, such as a seasonally available pumpkin spice latte, or a peppermint cake available only during the month of December. Computing device 104 locates a refreshment provider in reference to a refreshment position. Computing device 104 may evaluate a refreshment provider to determine if a refreshment provider is located within a refreshment position contained within profile database 112 or if a refreshment provider offers a transmission option to a refreshment position. Computing device 104 may not further evaluate refreshment providers who are not located within a refreshment position and/or do not provide a transmission option to the refreshment position.

With continued reference to FIG. 1, computing device 104 is configured to generate a refreshment classifier 136. Computing device 104 generates a classifier using a classification algorithm, defined as a process whereby computing device 104 derives from training data, a model known as a "classifier" for sorting inputs into categories or bins of data. Classification algorithms may include linear classifiers such as logistic regression, Naïve Bayes classification, Fisher's linear discriminant, k-nearest neighbors, support vector machines, quadratic classifiers, Kernel estimation, decision trees, boosted trees, random forest, neural networks, and the like. A "refreshment classifier" as used in this disclosure, is a classifier that utilizes a current refreshment possibility 128 as an input, and outputs refreshment descriptions. Refreshment classifier may be trained using training data, including any of the training data as described herein. Refreshment classifier may be trained utilizing a user profile. A "refreshment description," as used in this disclosure, is an indication as to a refreshment possibility complying with any information contained within a user profile 108. For instance and without limitation, a refreshment description may indicate that a refreshment possibility containing wild black cod sautéed in avocado oil and served with mashed cauliflower and steamed asparagus complies with a user profile 108 that contains a preference for a paleo diet. In yet another non-limiting example, a refreshment description may indicate that a refreshment possibility containing fried chicken and waffles does not comply with a user profile 108 that contains a preference for a low cholesterol diet as suggested by a medical professional. Computing device 104 orders refreshment descriptions using a user profile 108*d*. Computing device 104 may sort and/or align refreshment possibilities based on a continuum, ranking the refreshment possibilities from those that comply the most with information contained within a user profile 108, to those that comply the least or not at all with the user profile 108. Computing device 104 may display refreshment possibilities ordered on a continuum on graphical user interface 116. Computing device 104 may transmit refreshment possibilities ordered on a continuum to user client device 124. This may be performed using any network methodology as described herein.

With continued reference to FIG. 1, computing device 104 is configured to output a refreshment target 140 for a user, using a user profile 108. A "refreshment target," as used in this disclosure, is an individual ideal eating plan intended to optimize a user's nutrition, based on information contained within a user profile 108. A refreshment target 140 may specify optimized nutrition based on ideal amount of protein, carbohydrates, dietary fiber, fat, saturated fat, vitamins, minerals, phytonutrients and the like that should be contained within a user's diet. For instance and without limitation, a refreshment target 140 may recommend a user seeking to follow a vegetarian diet to consume foods high in Vitamin B12, such as cheese, eggs, nutritional yeast, fortified cereal, low-fat milk, and the like. In yet another non-limiting example, a refreshment target 140 may recommend a user with high blood sugar to consume foods rich in soluble fiber including oatmeal, beans, rice bran, oat bran, citrus fruits, apples, strawberries, peas, and potatoes, and to avoid foods that contain simple carbohydrates that can quickly spike blood sugar such as white sugar, white rice, candy, fruit juice concentrate, baked goods, and soda. Information utilized to generate a refreshment target 140 may be contained within target database. Target database 144 may be implemented as any data structure suitable for use as profile database 112 as described above. Target database 144 may contain information utilized to generate a refreshment target 140, such as information about refreshment target 140 based on a user's activity level, risk factor for certain diseases and disorders, habits and behaviors, willingness of a user to change behaviors and/or comply, nutrient and/or ingredient information, and the like. Information contained within target database 144 may be provided by one or more experts in the field, as described below in more detail.

With continued reference to FIG. 1, computing device 104 is configured to output a refreshment target 140 using a target algorithm 148. Computing device 104 selects an element of user data contained within a user profile 108. Computing device 104 may select an element of user data by generating a. A "query," as used in this disclosure, is any information utilized to retrieve an element of user data contained within a user profile 108. Retrieval of an element of user data may be utilized by computing device 104 output a refreshment target 140, such as by inputting the element of user data into target algorithm 148 as described in more detail below. Computing device 104 may generate a query to extract particular information relating to a user that may be utilized to output a refreshment target 140 for the user. For instance and without limitation, computing device 104 may generate a query relating to a biological extraction, to utilize a user's biological extraction to output a refreshment target 140. In yet another non-limiting example, computing device 104 may generate a query relating to a risk factor, to assess if a user has any genetic risk factors and/or predispositions to certain diseases, conditions and/or illnesses. Computing device 104 utilizes a selected element of user data to generate a target algorithm 148. A "target algorithm," as used in this disclosure, is an algorithm that utilizes an element of user data as an input, and outputs a refreshment target 140. A target algorithm 148 may be implemented as any algorithm and/or machine-learning model suitable for use as refreshment algorithm 120 as described above in more detail. For instance and without limitation, a target algorithm 148 may be implemented as a linear regression algorithm. In yet another non-limiting example, a target algorithm 148 may be implemented as a k-means clustering algorithm. Target algorithm 148 is trained using training data, including any of the training data as described herein. Training data may be obtained from previous iterations of target algorithm 148, user inputs, user questionnaire responses, expert inputs, and the like. Refreshment algorithm 120 and/or target algorithm 148 may be implemented as any machine-learning process, including for instance, and without limitation, as described in U.S. Nonprovisional application Ser. No. 16/375,303, filed on Apr. 4, 2019, and entitled "SYSTEMS AND METHODS FOR GENERATING ALIMENTARY INSTRUCTION SETS BASED ON VIBRANT CONSTITUTIONAL GUIDANCE," the entirety of which is incorporated herein by reference.

With continued reference to FIG. 1, computing device 104 is configured to compare current refreshment possibilities and a refreshment target 140. Computing device 104 may compare current refreshment possibilities to determine how current refreshment possibilities meet and/or do not meet a refreshment target 140. Computing device 104 may evaluate current refreshment possibilities to evaluate ingredients contained within current refreshment possibilities, nutrition and/or nutrients provided by current refreshment possibilities, style of cuisine of current refreshment possibilities and the like. Such information may be compared to a refreshment target 140 to determine what refreshment possibilities are in align with and/or meeting or exceed the refreshment target 140, and what refreshment possibilities are not in align with and/or do not meet or exceed the refreshment target 140. Computing device 104 may evaluate current refreshment possibilities such as by consulting refreshment provider database 132 and/or target database. Computing device 104 may evaluate information contained within profile database 112 to determine how refreshment possibilities align with user refreshment preferences, and how likely it is that a refreshment possibility will actually be consumed by a user. For example, computing device 104 may compare a refreshment possibility that contains brown rice, grilled chicken breast, ¼ of an avocado, black beans, lactose free sour cream and lactose free cheese to a refreshment target 140 that recommends the user follow a lactose free diet, due to a genetic mutation of the LCT gene that inhibits the ability of the user to produce lactase, and break down lactose. In yet another non-limiting example, computing device 104 may compare a refreshment possibility that contains spring rolls made with non-organic and genetically modified tofu, and evaluate the ingredients to a refreshment target 140 that recommends avoiding all genetically modified organisms, as the user is currently pregnant and consumption of genetically modified organisms may contribute to toxicity within the user's body and create complications for the mother and her unborn child.

With continued reference to FIG. 1, computing device 104 is configured to determine a deficiency between a current refreshment possibility 128 and a refreshment target 140. A "deficiency," as used in this disclosure, is any failing or shortcoming of a refreshment possibility to align with nutritional recommendations contained within a refreshment target 140. A deficiency may identify particular ingredients contained within a refreshment possibility that contribute to a deficiency. For example, a deficiency may identify that chicken fried in coconut oil contains too much saturated fat for a refreshment possibility that recommends a user to consume no more than 10 grams of saturated fat per day. A deficiency may identify certain ingredients and/or nutrients that may be missing to cause a deficiency. For example, a deficiency may identify that a refreshment possibility that contains a white bagel topped with full fat cream cheese contains a deficiency for a user who is following a Mediterranean diet, because it lacks nutrients such as fiber, and does not contain enough whole grains. Computing device 104 is configured to suggest a replacement intended to cure a deficiency. A "replacement," as used in this disclosure, is any modification to a deficiency, intended to correct and/or lessen the deficiency. A replacement may contain a recommendation to substitute one or more ingredients contained within a refreshment possibility. For example, a replacement may recommend an ingredient such as butter be replaced with olive oil. A replacement may contain a recommendation to omit an ingredient. For example, a replacement may recommend a refreshment possibility to omit mozzarella cheese on top of a stuffed pepper. A replacement may contain a recommendation to add in one or more additional ingredients to a refreshment possibility. For example, a replacement may recommend the addition of chia seeds to an acai bowl to add in extra fiber and omega 3 fatty acids. A replacement may contain a recommendation to modify the way in which a refreshment possibility is prepared and/or cooked. For instance and without limitation, replacement may recommend that a refreshment possibility containing salmon be grilled in lieu of pan frying the salmon.

With continued reference to FIG. 1, a "refreshment preference," as used in this disclosure, is a preference a user has regarding any foods and/or beverages consumed by a human being; a refreshment preference may include any preference a user may have regarding any foods and/or beverages. A refreshment preference may describe any foods a user likes to eat, foods a user does not like to eat, meals a user likes to eat, meals a user does not like to eat, ingredients a user likes to eat, ingredients a user does not like to eat and the like. Elements of data may relate to eating patterns of a user, such as how many meals each day a user eats, times of the day the user usually eats meals, number of snacks a user eats each day, and the like. Elements of data may relate to fiscal amounts, including how much a user spends on average on food, and/or how much a user is willing to spend on food. Elements of data may relate to food preparation preferences, such as how often a user cooks meals at home, eats meals out at a restaurants, orders meals to be delivered, acquires prepared meals from restaurants and/or grocery stores, shops for groceries, orders meal kits, and the like. Elements of data may relate to ingredient standards of foods, such as a user's preference for free range poultry, organically sourced ingredients, grass fed meat, ingredients free of artificial additives and/or preservatives, and the like. Elements of data may relate to logged meal entries, containing a record of one or more meals that a user consumed previously with a timestamp indicating when the meal was consumed, and what was contained in the meal. Elements of data may relate to food source preferences, describing positions of stores, restaurants, food outposts such as prepared food kitchens and/or websites where a user acquires food, meals, and/or ingredients from. Elements of data may relate to physical activity the user engages in, such as any exercise programs, gym, workouts, and/or styles of exercise that a user prefers to engage upon. Elements of data may relate to data indicative of a user's physiological state, including for example a biological extraction. Physiological state may be evaluated with regard to one or more measurements of the physical state of a person's body, one or more systems within a person's body such as a circulatory system, a digestive system, a nervous system, or the like, one or more organs within a person's body, and/or any other subdivision of a person's body useful for diagnostic or prognostic utilization. Physiological data may include any data indicative of a person's physiological state; physiological state may be evaluated with regard to one or more measures of health of a person's body, one or more systems within a person's body such as a circulatory system, a digestive system, a nervous system, or the like, one or more organs within a person's body, and/or any other subdivision of a person's body useful for diagnostic or prognostic purposes. For instance, and without limitation, a particular set of biomarkers, test results, and/or biochemical information may be recognized in a given medical field as useful for identifying various disease conditions or prognoses within a relevant field. As a non-limiting example, and without limitation, physiological data describing red blood cells, such as red blood cell count, hemoglobin levels, hematocrit, mean corpuscular volume, mean corpuscular hemoglobin, and/or mean corpuscular hemoglobin concentration may be recognized as useful for identifying various conditions such as dehydration, high testosterone, nutrient deficiencies, kidney dysfunction, chronic inflammation, anemia, and/or blood loss. A biological extraction may include any of the biological extractions as disclosed in U.S. Nonprovisional application Ser. No. 16/659,817, filed on Oct. 22, 2019, and titled "METHODS AND SYSTEMS FOR IDENTIFYING COMPATIBLE MEAL OPTIONS," the entirety of which is incorporated herein by reference.

With continued reference to FIG. 1, computing device 104 is configured to generate a refreshment outlook 152. A "refreshment outlook 152," as used in this disclosure, is a menu containing refreshment possibilities that align with a user's refreshment target 140 and/or a user's profile. Computing device 104 may display a refreshment outlook 152 on graphical user interface 116 located on computing device 104. In yet another non-limiting example, computing device 104 may transmit a refreshment outlook 152 to a user client device 124, using any network methodology as described herein.

With continued reference to FIG. 1, computing device 104 is configured to receive a refreshment selection contained within a refreshment outlook 152 from a user client device 124. A "refreshment selection," as used in this disclosure, is any refreshment possibility contained within a refreshment outlook 152 that a user has chosen to consume. Computing device 104 organizes transmission of a refreshment selection to a user. Transmission of a refreshment selection may include any transmission as described above in more detail. For example, transmission may include coordinating with a grocery store to deliver ingredients to a user for the user to cook a refreshment possibility at home. In yet another non-limiting example, transmission may include coordinating with a meal delivery service to ship a meal kit to a user's house so that a user can prepare a refreshment possibility at home, using ingredients contained within the meal kit. In yet another non-limiting example, transmission may include coordinating delivery of a meal prepared by a restaurant to a user's home. In yet another non-limiting example, transmission may include coordinating delivery of prepared meals that a user can store at home and cook and/or reheat when desired.

Figure 2:
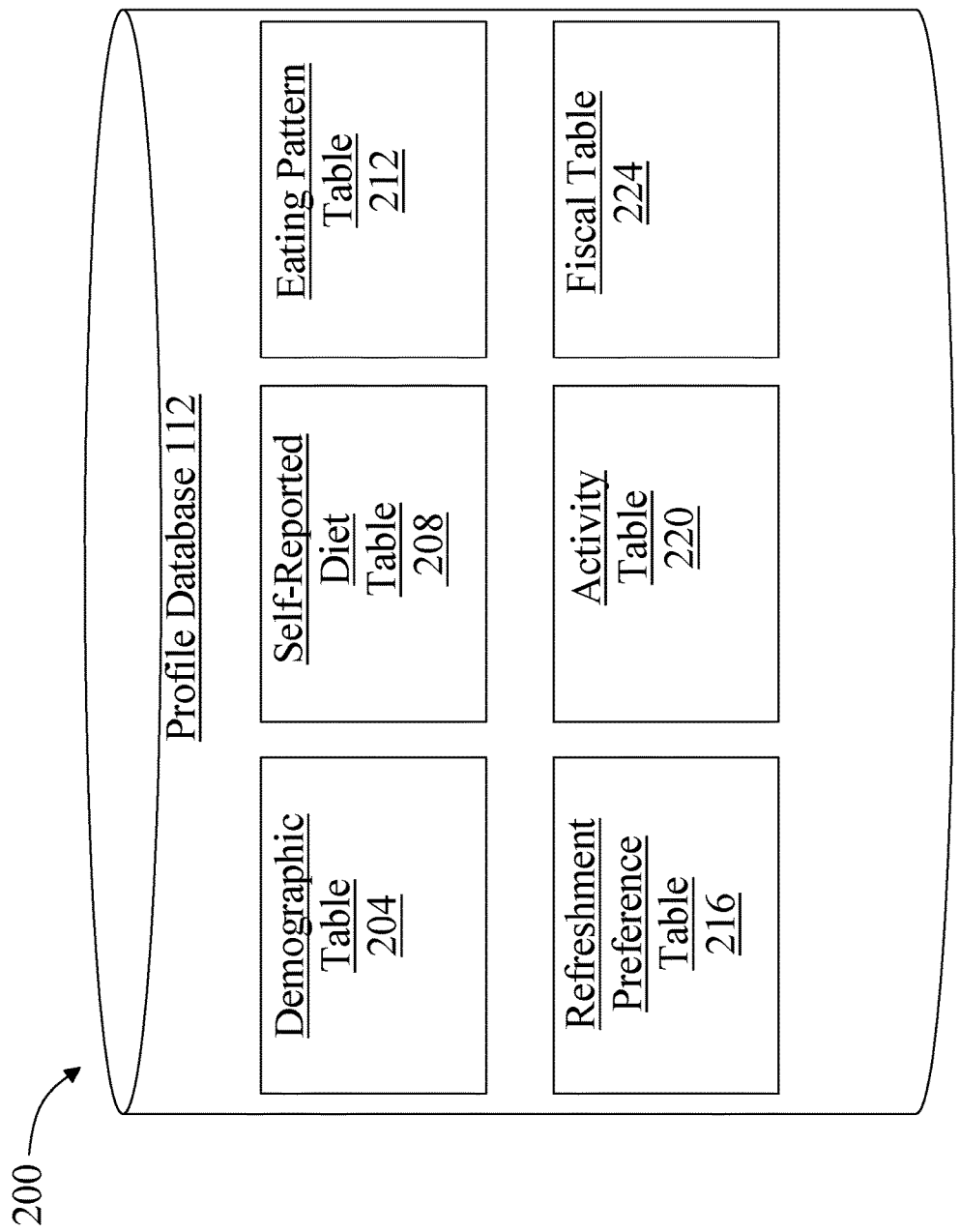
FIG. 2 is a block diagram illustrating an exemplary embodiment of a profile database.

Referring now to FIG. 2, an exemplary embodiment 200 of profile database 112 is illustrated. Profile database 112 may be implemented as any data structure suitable for use as described above in more detail in reference to FIG. 1. One or more tables contained within profile database 112 may include demographic table 204; demographic table 204 may include background demographic information pertaining to a user. For instance and without limitation, demographic table 204 may contain a user's full legal name, marital status, and occupation. One or more tables contained within profile database 112 may include self-reported diet table 208; self-reported diet table 208 may contain information describing a user's dietary preferences, and dietary habits.

For instance and without limitation, self-reported diet table 208 may describe a user's lactose free diet that the user follows, because of a self-reported lactose intolerance. One or more tables contained within profile database 112 may include eating pattern table 212; eating pattern table 212 may contain information regarding a user's eating patterns. For instance and without limitation, eating pattern table 212 may describe a typical breakfast that a user eats most morning consisting of oatmeal topped with frozen blueberries and chopped pecans, and that the user typically eats breakfast between 7 am and 8 am every morning. One or more tables contained within profile database 112 may include refreshment preference table 216; refreshment preference table 216 may include information describing a user's preferences regarding refreshment possibilities. For instance and without limitation, refreshment preference table 216 may contain a list of foods that a user likes or dislikes, a list of meals that a user likes or dislikes, and a list of ingredients that a user likes or dislikes. One or more tables contained within profile database 112 may include activity table 220; activity table 220 may contain information regarding any physical activity that a user may perform. For instance and without limitation, activity table 220 may contain an entry describing a user's exercise routine that includes two days of weight bearing exercise each week, and three days of cardiovascular exercise each week. One or more tables contained within profile database 112 may include fiscal table 224; fiscal table 224 may contain information describing a user's budget in regards to refreshment possibilities. For instance and without limitation, fiscal table 224 may contain an entry describing a user's preference to pay no more than $50 each week on all food costs.

Figure 3:
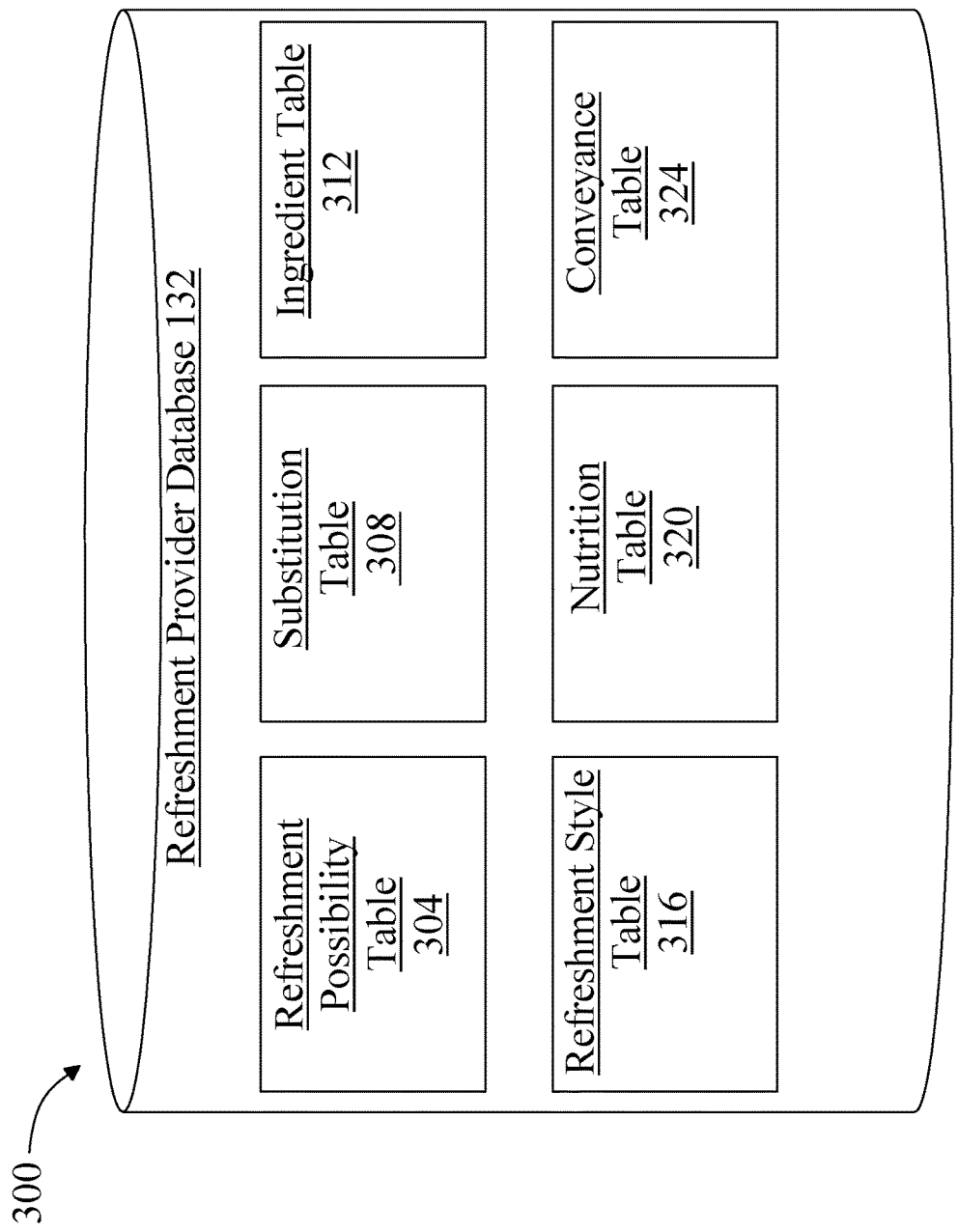
FIG. 3 is a block diagram illustrating an exemplary embodiment of a refreshment provider database.

Referring now to FIG. 3, an exemplary embodiment 300 of refreshment provider database 132 is illustrated. Refreshment provider database 132 may be implemented as any data structure suitable for use as described above in more detail in reference to FIG. 1. One or more tables contained within refreshment provider database 132 may include refreshment possibility table 304; refreshment possibility table 304 may contain a current list of refreshment possibilities available from one or more refreshment providers. For instance and without limitation, refreshment possibility table 304 may contain a list of refreshment possibilities available at a local café for lunch. One or more tables contained within refreshment provider database 132 may include substitution table 308; substitution table 308 may contain an indication of a refreshment provider's ability to substitute ingredients contained within a refreshment possibility. For instance and without limitation, substitution table 308 may contain information indicating a particular refreshment possibility can be made gluten free but not vegan. One or more tables contained within refreshment provider database may include ingredient table 312; ingredient table 312 may include information describing ingredients contained within refreshment possibilities. For instance and without limitation, ingredient table 312 may specify that a refreshment possibility consisting of a cobb salad is made with ingredients that include organic romaine lettuce, free range eggs, organic free range chicken sautéed in cold press organic olive oil and seasoned with salt and pepper, organic maple bacon, and organic avocado. One or more tables contained within refreshment provider database 132 may include refreshment style table 316; refreshment style table 316 may include information regarding a cuisine style and/or style of cooking of one or more refreshment providers. For instance and without limitation, refreshment style table 316 may contain information describing a refreshment provider's style as Mediterranean with inspiration from Italian and Greek recipes. One or more tables contained within refreshment provider database 132 may include nutrition table 320; nutrition table 320 may include information regarding nutritional information contained within a refreshment possibility. For instance and without limitation, nutrition table 320 may contain information about a refreshment possibility, such as total fat, saturated fat, cholesterol, sodium, carbohydrates, dietary fiber, total sugar, protein and the like contained within the refreshment possibility. One or more tables contained within refreshment provider database 132 may include transmission table 324; transmission table 324 may include information regarding transmission options from a refreshment provider. For instance and without limitation, transmission table 324 may include information that a particular refreshment provider provides dine-in, take out, and delivery options.

Figure 4:
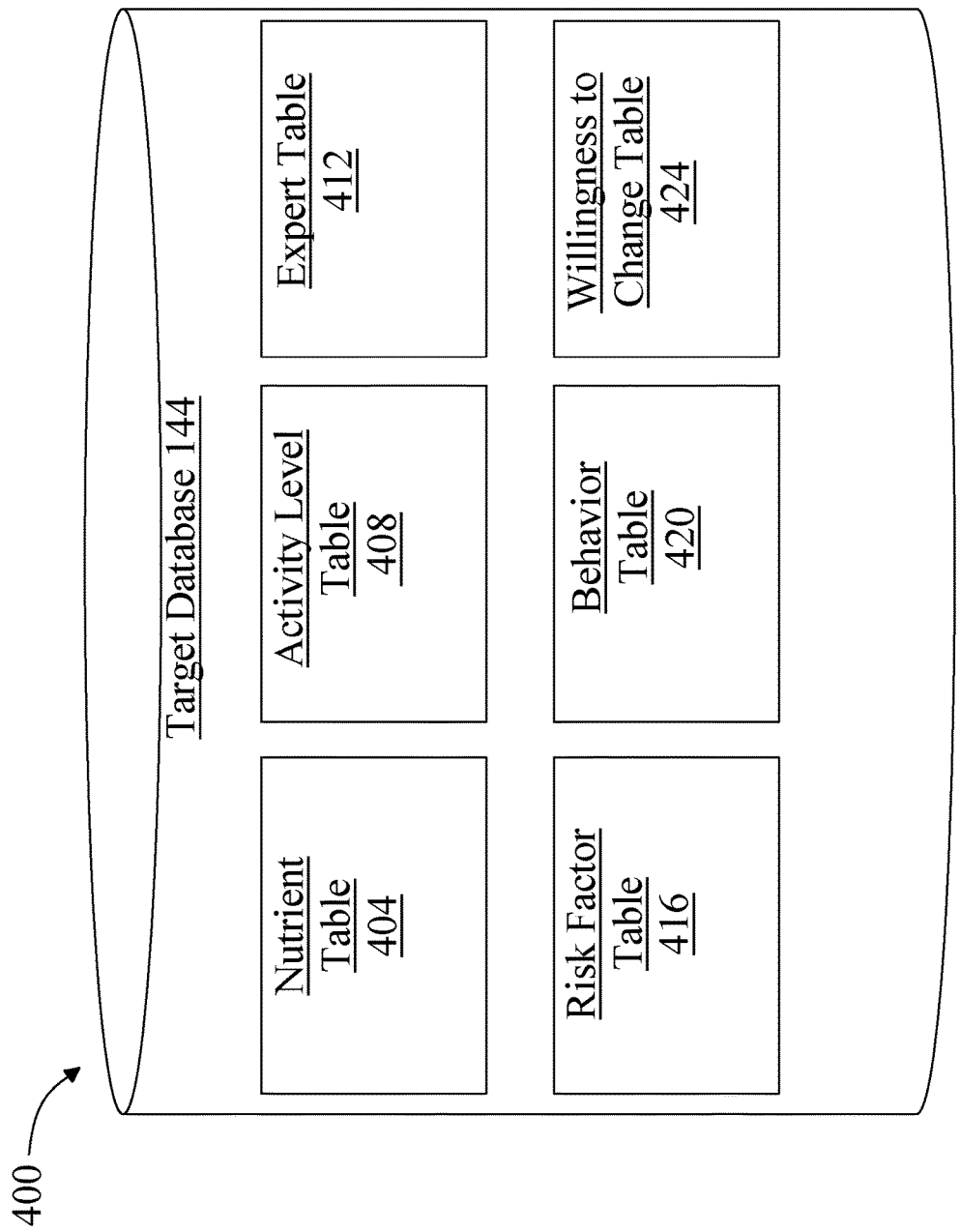
FIG. 4 is a block diagram illustrating an exemplary embodiment of a target database.

Referring now to FIG. 4, an exemplary embodiment 400 of target database 144 is illustrated. Target database 144 may be implemented as any database suitable for use as profile database 112 as described above in more detail in reference to FIG. 1. One or more tables contained within target database 144 may include nutrient table 204; nutrient table 204 may include information regarding target nutrients for a user. For instance and without limitation, nutrient table 204 may include information about target nutrients such as total fat, total saturated fat, total cholesterol, total sodium, total carbohydrates, total dietary fiber, total sugar, and total protein that a user should strive to consume each day. One or more tables contained within target database 144 may include activity level table 408; activity level table 408 may include information regarding target activity levels that a user should strive to achieve over a certain period of time. For instance and without limitation, activity level table 408 may include information describing a user's target activity level to include a minimum of thirty minutes of cardiovascular exercise five days each week. One or more tables contained within target database 144 may include expert table 412; expert table 412 may include information obtained from experts utilized to calculate refreshment target 140. For instance and without limitation, expert table 412 may include an entry from a functional medicine doctor detailing recommended activity levels for users with various medical conditions. One or more tables contained within target database 144 may include risk factor table 416; risk factor table 416 may include information regarding risk factors and the effect of risk factors on refreshment target 140. For instance and without limitation, risk factor table 416 may specify that a user with a risk factor for heart disease requires a refreshment target 140 that contains no more than 25% of daily calories from fat sources. One or more tables contained within target database 144 may include behavior table 420; behavior table 420 may include information regarding a user's behaviors and habits surrounding refreshment possibilities. For instance and without limitation, behavior table 420 may include information describing a refreshment target 140 that contains a requirement to consume six meals each day as requiring a behavior from a user to be motivated to make such a change in their lifestyle. One or more tables contained within target database 144 may include willingness to change table 424; willingness to change table 424 may include information describing how willing a user needs to be to change habits and ways of life to comply with a refreshment target 140. For instance and without limitation, willingness to change table 424 may indicate that a user with a refreshment target 140 that requires consuming a vegan diet will require a greater willingness to change as compared to a refreshment target 140 that requires consuming a standard American diet.

Figure 5A:
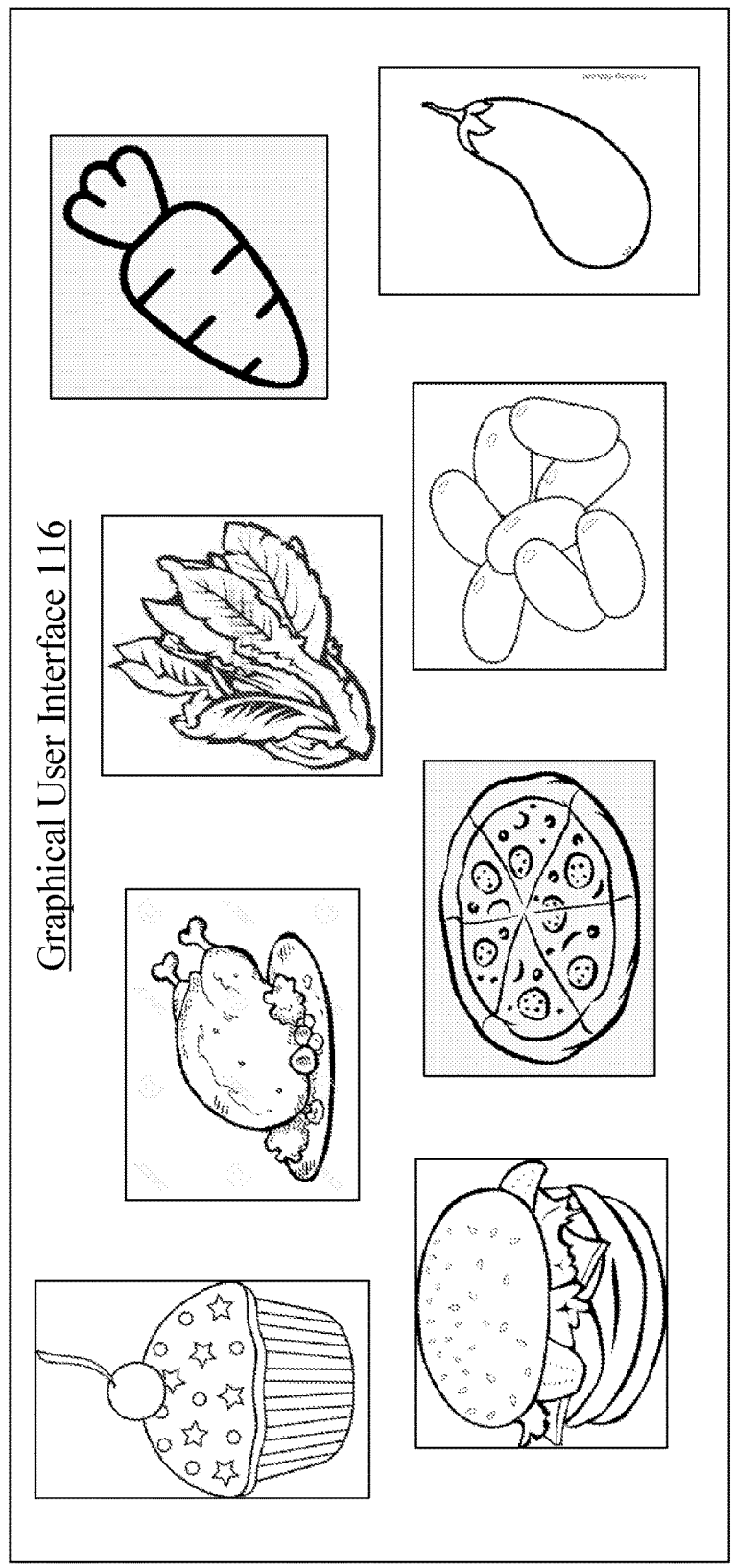
Figure 5B:
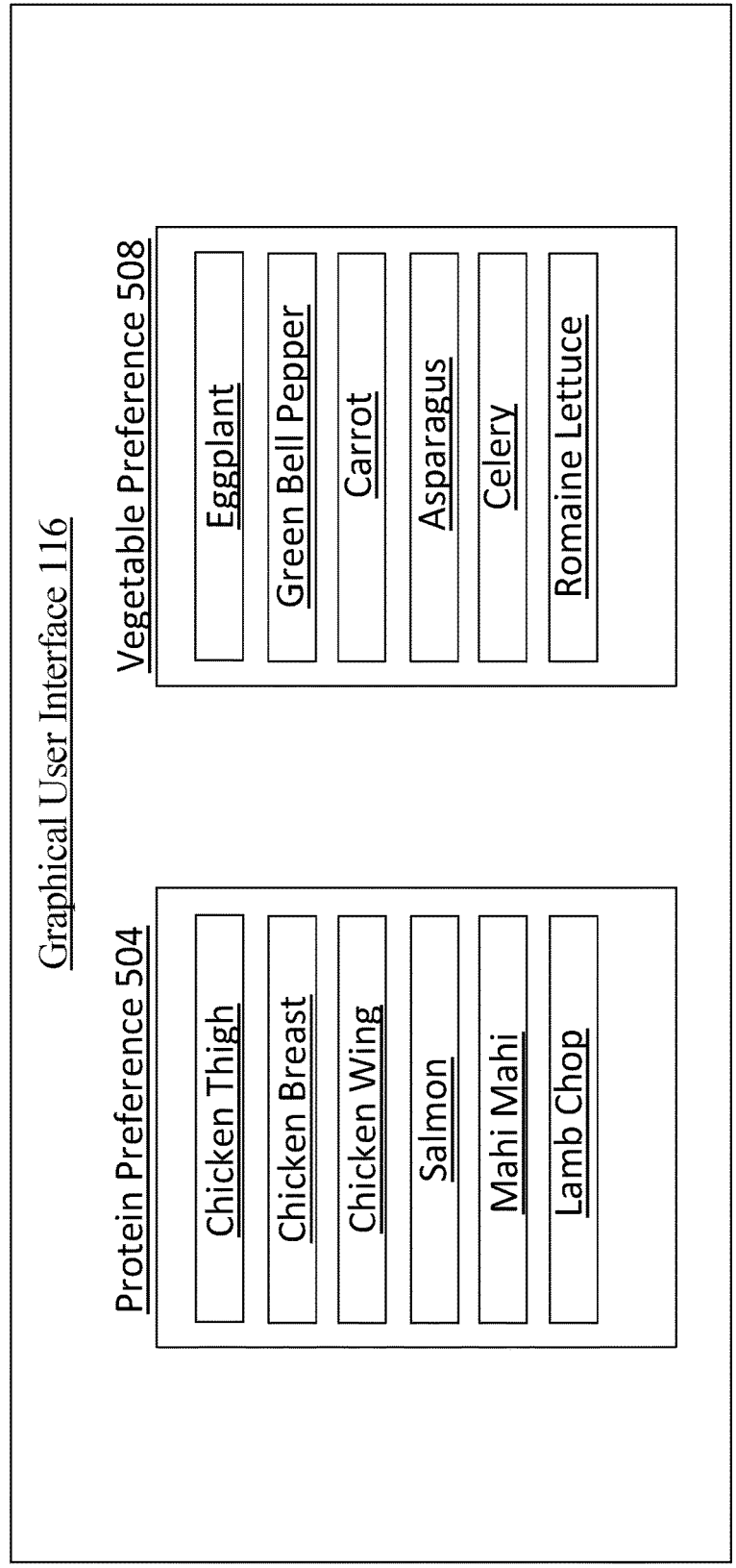

Referring now to FIGS. 5A-5C, an exemplary embodiment 500 of graphical user interface 116 is illustrated. Referring now to FIG. 5A, an exemplary embodiment of user self-assessment displayed on graphical user interface 116 is illustrated. In an embodiment, graphical user interface 116 may display a picture of a refreshment possibility that a user can select to indicate a user's refreshment preferences. For example, a user may select a photograph of roast chicken to indicate a refreshment possibility that a user likes, and the user may select a photograph of a carrot to indicate a refreshment possibility that a user dislike. Such information obtained from a user regarding a user's refreshment preferences may be stored in profile database 112. Referring now to FIG. 5B, an exemplary embodiment of user self-assessment displayed on graphical user interface 116 is illustrated. In an embodiment, graphical user interface 116 may display a list of various refreshment possibilities, and/or refreshment ingredients, to obtain information regarding a user's refreshment preferences, and/or eating habits. In such an instance, a user may select a protein preference 504, indicating various types of proteins that a user likes to consume. A user may select a vegetable preference 508, indicating various types of vegetables that a user likes to consume. Such information may be stored within profile database 112 and may be utilized to generate a user profile 108. Graphical user interface 116 may display various other ingredients, and/or refreshment possibilities that a user can select to indicate refreshment preferences. Referring now to FIG. 5C, an exemplary embodiment of user self-assessment displayed on graphical user interface 116 is illustrated. In an embodiment, graphical user interface 116 may contain free form textual fields that may prompt a user for information regarding information to be stored within profile database. For example, graphical user interface 116 may display prompts regarding refreshment pattern 512, that may allow a user to finish the sentence and provide in his or her own words, a response to the user self-assessment.

Figure 6:
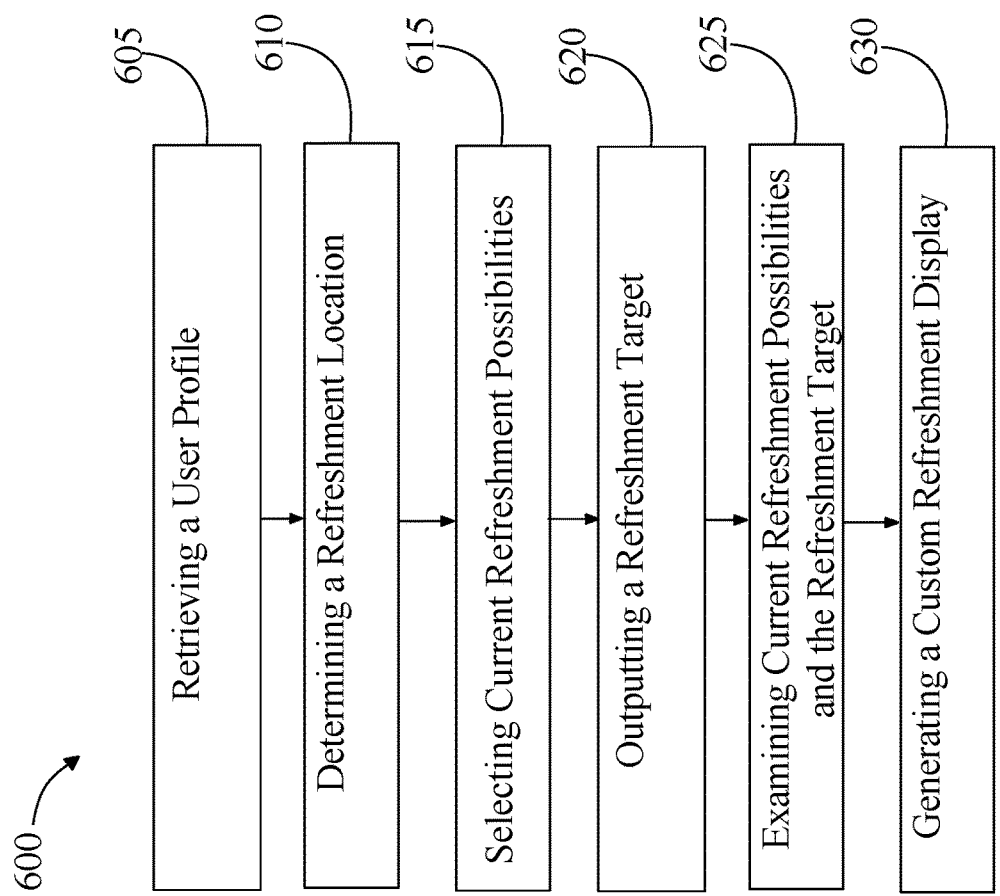
FIG. 6 is a process flow diagram illustrating an exemplary embodiment of a method of displaying refreshment outlooks.

Referring now to FIG. 6, an exemplary embodiment of a method of displaying refreshment outlooks is illustrated. At step 605, computing device 104 retrieves a user profile 108 from a profile database 112. A user profile 108 includes any of the user profile 108 as described above in more detail in reference to FIG. 1. A user profile 108 contains a compilation of one or more elements of data relating to a user. For instance and without limitation, a user profile 108 may contain information relating to a user's dietary preferences and eating habits, including information describing how many meals each day a user consumes, what types of foods a user eats at meals, what time of day a user eats meals, and the like. A user profile 108 may include information relating to a user's self-reported diet, such as a particular type of diet or pattern of eating that a user follows. For example, a user profile 108 may indicate that a user follows a gluten free diet, because when the user consumes foods containing gluten the user feels sluggish and bloated and has found that eliminating gluten has helped the user. A user profile 108 may be generated using a user self-assessment. A self-assessment includes any of the self-assessments as described above in more detail in reference to FIG. 1. For example, a self-assessment may contain a series of prompts and/or questions asking a user to provide answers to one or more questions or calls for information. In yet another non-limiting example, a self-assessment may include a series of displays that are displayed to a user on a graphical user interface 116, where a user may select one or more refreshment preferences, as described above in more detail in reference to FIGS. 5A-5C. One or more entries relating to a user profile 108 may be stored in profile database 112. Profile database 112 may be implemented as any structure as described above in more detail in reference to FIG. 1. A user profile 108 identifies a refreshment preference. A refreshment preference includes any of the refreshment preferences as described above in more detail in reference to FIG. 1. For example, a refreshment preference may indicate a user's preference to like to eat foods that include red meat, wild salmon, and sweet potatoes, and to dislike eating foods that include chicken, asparagus, and brown rice. A refreshment preference may describe one or more meals that a user likes to eat, such as a user who enjoys eating a hamburger with French fries, but dislikes eating pepperoni pizza. Computing device 104 identifies a refreshment combination preference using a user profile. A refreshment combination preference includes any of the refreshment combination preferences as described above in more detail in reference to FIG. 1. In an embodiment, a refreshment combination preference may contain a suggestion of a refreshment possibility and/or ingredient that a user may like or dislike, using information contained within profile database. For instance and without limitation, a user's like of cheeseburgers may prompt computing device 104 to generate a refreshment combination preference that contains other refreshment possibilities containing ground beef including meatloaf, sloppy joes, enchiladas, shepherd's pie, and stuffed peppers. Computing device 104 may generate a refreshment combination preference such as by consulting refreshment provider database.

With continued reference to FIG. 6, computing device 104 may identify a refreshment preference using refreshment algorithm 120. Refreshment algorithm 120 includes any of the refreshment algorithm 120 as described above in more detail in reference to FIG. 1. Refreshment algorithm 120 may be implemented as any of the machine-learning processes as described above in more detail in reference to FIG. 1. Refreshment algorithm 120 utilizes a user profile 108 as an input, and outputs a refreshment preference. In an embodiment, computing device 104 may utilize as an input, all information contained within a user profile 108 as an input to refreshment algorithm 120. In an embodiment, computing device 104 may select information contained within a user profile 108 as an input to refreshment algorithm 120. For example, computing device 104 may retrieve an entry contained within user profile 108, such as a biological extraction pertaining to a user, and utilize the biological extraction pertaining to the user as an input to refreshment algorithm 120, and output refreshment preferences. In yet another non-limiting example, computing device 104 may retrieve an entry contained within user profile 108, such as an entry describing a user's eating patterns and food preferences as an input to refreshment algorithm 120, and output refreshment preference. Refreshment algorithm 120 is trained using training data, including any of the training data as described above in more detail in reference to FIG. 1.

With continued reference to FIG. 6, at step 610, computing device 104 determines a refreshment position using a user profile 108. A refreshment position includes any of the refreshment positions as described above in more detail in reference to FIG. 1. A refreshment position includes any geographical area, that a user visits to purchase and/or acquire refreshments. For instance and without limitation, a refreshment position may specify that a user resides in Atlanta, Georgia, and travels on workdays to Marietta, Georgia. In yet another non-limiting example, a refreshment position may specify that a user resides in Anchorage, Alaska, but will be traveling to Seattle, Washington for work for the next three weeks straight. A refreshment position may be updated and/or modified based on inputs received from user client device 124. A refreshment position may be stored within profile database 112.

With continued reference to FIG. 6, at step 615, computing device 104 selects current refreshment possibilities contained within a refreshment position. Selecting current refreshment possibilities includes determining what refreshment possibilities are currently offered and/or available for purchase by a user from a refreshment provider. Computing device 104 may evaluate current refreshment possibilities by retrieving information contained within refreshment provider database 132. In an embodiment, computing device 104 may generate a query based on information contained within a refreshment position and utilize the query to select refreshment possibilities available within the refreshment position contained within the query. Information regarding current refreshment possibilities may be stored and/or updated by refreshment providers and contained within refreshment provider database 132. For instance and without limitation, computing device 104 may locate two restaurants that are currently offering lunch and dinner options available for a user located within the user's refreshment position. Computing device 104 is configured to receive an input from a refreshment provider, identifying current refreshment possibilities. This may be performed using any network methodology as described herein. One or more inputs received from a refreshment provider may be stored within refreshment provider database 132. Computing device 104 selects refreshment providers in reference to a refreshment position. For instance and without limitation, computing device 104 may receive an input from a grocery store located in San Diego, California that has a menu of five different dinner entrees available for sale. Computing device 104 may store the input within refreshment provider database 132. Computing device 104 locates the grocery store located in San Diego as compared to a refreshment position, which specifies that a user is located in Oceanside, California and works in San Diego, California Computing device 104 may determine that the grocery store is located within the refreshment position, and select the grocery store as a current refreshment possibility.

With continued reference to FIG. 6, computing device 104 generates a refreshment classifier 136. A refreshment classifier 136 includes any of the refreshment classifier 136 as described above in more detail in reference to FIG. 1. Refreshment classifier 136 utilizes a current refreshment possibility 128 as an input, and outputs refreshment descriptions. A refreshment description contains an indication as to a refreshment possibility complying with any information contained within a user profile 108. For instance and without limitation, a refreshment possibility that contains chicken parmesan with a side of penne pasta with tomato sauce may be classified to contain a refreshment description that indicates the refreshment possibility does not comply with a low-FODMAP diet that a user is following based on information contained within profile database 112. In yet another non-limiting example, a refreshment possibility that contains tofu and broccoli served over white rice in a sesame sauce may be classified by refreshment classifier 136 to contain a refreshment description that indicates the refreshment possibility does comply with a vegan diet based on information contained within profile database 112. Computing device 104 orders refreshment descriptions using a user profile 108. Computing device 104 may order refreshment descriptions using any of the methods as described above in more detail in reference to FIG. 1. For instance and without limitation, computing device 104 may order refreshment descriptions in order from refreshment possibilities containing refreshment descriptions that indicate a refreshment possibility strictly complies with information contained within a user profile 108, down to refreshment possibilities that do not comply with information contained within the user profile 108.

With continued reference to FIG. 6, at step 620, computing device 104 outputs a refreshment target 140. A refreshment target 140 includes any of the refreshment target 140 as described above in more detail in reference to FIG. 1. A refreshment target 140 contains an individual ideal eating plan intended to optimize a user's nutrition, based on information contained within a user profile 108. For instance and without limitation, a refreshment target 140 may contain information indicating goal nutrient information for a user, including a breakdown of how much total fat a user should consume on a daily basis, how much saturated fat a user should consume on a daily basis, a total amount of calories a user should consume on a daily basis, and the like. A refreshment target 140 may be generated for a user using information contained within target database. Computing device 104 may generate a refreshment target 140 using one or more machine-learning algorithms. Computing device 104 selects an element of user data contained within a user profile 108. Computing device 104 may select an element of user data by generating a query. A query may include any of the queries as described above in more detail in reference to FIG. 1. Computing device 104 may generate a query to extract a particular element of user data contained within user profile 108 such as a particular biological extraction, or an information pertaining to an eating pattern or refreshment preference of a user. In an embodiment, computing device 104 may select all information contained within a user profile 108. Computing device 104 calculates a target algorithm 148 which utilizes an element of user data as an input, and outputs a refreshment target 140. Target algorithm 148 includes any of the target algorithm 148 as described above in more detail in reference to FIG. 1. Target algorithm 148 may be implemented as any of the machine-learning processes and/or models as described above in more detail in reference to FIG. 1. Target algorithm 148 may be trained using any of the training data as described above in more detail in reference to FIG. 1.

With continued reference to FIG. 6, computing device 104 modifies refreshment target 140 using logged refreshment entries. A logged refreshment entry includes any of the logged refreshment entries as described above in more detail in reference to FIG. 1. A logged refreshment entry may be stored within profile database 112. Computing device 104 may retrieve a logged refreshment entry contained within a user profile 108. For instance and without limitation, user profile 108 may contained a logged refreshment entry that specifies a user's breakfast the prior morning consisted of millet flour and quinoa flour pancakes, topped with coconut cream and whipped berry compote. Computing device 104 may retrieve the logged refreshment entry and determine that the coconut cream contains an excess of saturated fat. In such an instance, computing device 104 modifies a refreshment target 140 to reduce the recommended saturated fat for the rest of the week using the information contained within the logged refreshment entry.

With continued reference to FIG. 6, at step 625 computing device 104 examines current refreshment possibilities and a refreshment target 140. Comparing includes evaluating current refreshment possibilities including nutritional information to nutritional information contained within a refreshment target 140. For example, computing device 104 may compare a refreshment possibility that contains 12 grams of saturated fat, to a refreshment target 140 that recommends a user to consume no more than 3 grams of saturated fat each day. Computing device 104 may compare current refreshment possibilities and a refreshment target 140 to determine a deficiency. A deficiency includes any of the deficiencies as described above in more detail in reference to FIG. 1. A deficiency includes any failing or shortcoming of a refreshment possibility to align with nutritional recommendations contained within a refreshment target 140. For instance and without limitation, computing device 104 may determine that a refreshment possibility that contains only 60 milligrams of calcium contains a deficiency for a user who has refreshment target 140 to consume a minimum of 180 milligrams of calcium at each meal, due to being at risk for osteoporosis. Computing device 104 is configured to suggest a replacement intended to cure a deficiency. A replacement, includes any of the replacements as described above in more detail in reference to FIG. 1. A replacement includes any modification to a deficiency, intended to correct and/or lessen the deficiency. For example, in the previous calcium example, computing device 104 may suggest a replacement such as modifying the refreshment possibility to contain an extra slice of cheese, to supplement and provide more calcium.

With continued reference to FIG. 6, at step 630, computing device 104 generates a refreshment outlook 152. A refreshment outlook 152 includes any of the refreshment outlook 152 as described above in more detail in reference to FIG. 1. A refreshment outlook 152 contains a menu including refreshment possibilities that align with a user's refreshment target 140 and/or a user's profile. Computing device 104 may display a refreshment outlook 152 on graphical user interface 116. In an embodiment, computing device 104 transmits a refreshment outlook 152 to a user client device 124. Computing device 104 receives a refreshment selection contained within a refreshment outlook 152 from a user client device 124. Computing device 104 receives the refreshment selection using any network methodology as described herein. A refreshment selection includes any refreshment possibility that a user has chosen to consume from the refreshment outlook 152. Computing device 104 organizes transmission of a refreshment selection using a user profile 108. Transmission includes any of the transmission as described above in more detail. Computing device 104 may organize transmission such as be transmitting a computing device operated by a refreshment provider, a refreshment selection. Refreshment selection may then be prepared and conveyed to a user using instructions provided by computing device 104 to refreshment provider.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
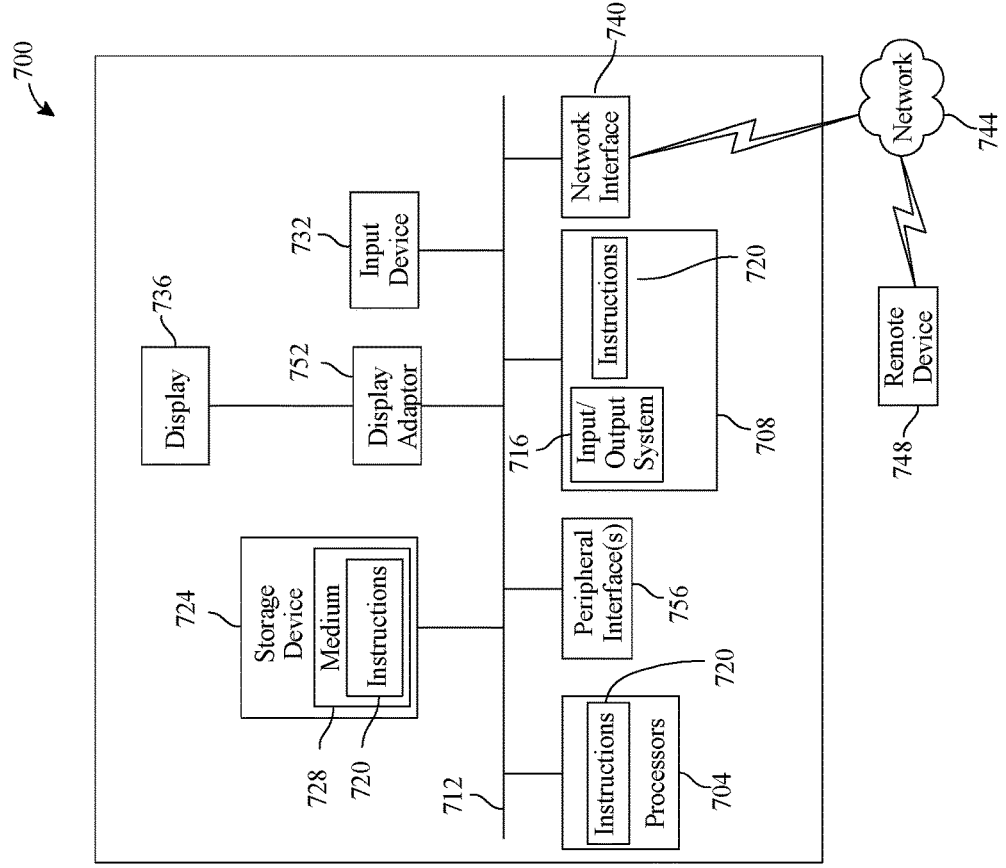
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for displaying refreshment outlooks, the system comprising a computing device, the computing device designed and configured to: retrieve a user profile from a profile database, wherein the user profile comprises:
 physiological data comprising a mean corpuscular hemoglobin concentration related to a disease state of a user;
 genetic risk factor data of the user related to the disease state; and
 genetic mutation data of the user, wherein the genetic mutation data comprises information on a genetic mutation of an LCT gene of the user;
determine a refreshment position using at least an element of the user profile, wherein the at least an element of the user profile includes a travel preference of the user, wherein the refreshment position includes a grocery store or restaurant location determined as a function of the travel preference of the user;

select current refreshment possibilities contained within the refreshment position, wherein the current refreshment possibility includes a food preparation preference of the user;

train a machine learning model using first training data, the first training data comprising historical user profile data correlated to historical refreshment targets;

output a refreshment target, using a query relating to a biological extraction to extract information relating to the user profile and a target database, wherein the target database comprises information provided by at least an expert, wherein outputting the refreshment target further comprises inputting at least the genetic risk factor data and the genetic mutation data of the user to a machine-learning model and outputting the refreshment target from the machine-learning model, wherein the refreshment target includes a recommendation that the user follow a lactose free diet;

examine current refreshment possibilities and the refreshment target, wherein examining the current refreshment possibilities comprises:

training a refreshment classifier using second training data, the second training data comprising historical user profile data correlated to historical refreshment descriptions;

generating the refreshment classifier, wherein the refreshment classifier utilizes the current refreshment possibilities as an input, and outputs refreshment descriptions for the current refreshment possibilities; and ordering the current refreshment possibilities as a function of the refreshment descriptions and the user profile; and generate a refreshment outlook as a function of the current refreshment possibilities and the refreshment target.

2. The system of claim 1, wherein the computing device is further configured to identify a refreshment combination preference using the user profile.

3. The system of claim 1, wherein the computing device is further configured to generate a refreshment algorithm, wherein the refreshment algorithm utilizes the user profile as an input, and outputs a refreshment preference.

4. The system of claim 1, wherein the computing device is further configured to:
receive an input from a refreshment provider wherein the input identifies current refreshment possibilities; and
identify the refreshment provider in reference to the refreshment position.

5. The system of claim 1, wherein the computing device is further configured to:
retrieve an element of user data contained within the user profile; and
generate a target algorithm wherein the target algorithm utilizes the element of user data as an input, and outputs the refreshment target.

6. The system of claim 1, wherein the computing device is further configured to:
determine a deficiency between the current refreshment possibilities and the refreshment target; and
suggest a replacement intended to cure the deficiency.

7. The system of claim 1, wherein the computing device is further configured to:
retrieve a logged refreshment entry contained within the user profile; and
adjust the refreshment target using the logged refreshment entry.

8. The system of claim 1, wherein the computing device is further configured to:
receive a refreshment selection contained within the refreshment outlook from a user client device; and
organize transmission of the refreshment selection using the user profile.

9. A method of displaying refreshment outlooks the method comprising:
retrieving, by a computing device, a user profile from a profile database, wherein the user profile comprises:
physiological data comprising a mean corpuscular hemoglobin concentration related to a disease state of a user;
genetic risk factor data of the user related to the disease state; and
genetic mutation data of the user, wherein the genetic mutation data comprises information on a genetic mutation of an LCT gene of the user;
determining, by the computing device, a refreshment position using at least an element of the user profile, wherein the at least an element of the user profile includes a travel preference of the user, wherein the refreshment position includes a grocery store or restaurant location determined as a function of the travel preference of the user;
selecting, by the computing device, current refreshment possibilities contained within the refreshment position, wherein the current refreshment possibilities include a food preparation preference of the user;
training, by the computing device, a machine learning model using first training data, the first training data comprising historical user profile data correlated to historical refreshment targets;
outputting, by the computing device, a refreshment target, using a query relating to a biological extraction to extract information relating to the user profile and a target database, wherein the target database comprises information provided by at least an expert, wherein outputting the refreshment target further comprises inputting at least the genetic risk factor data and the genetic mutation data of the user to a machine-learning model and outputting the refreshment target from the machine-learning model, wherein the refreshment target includes a recommendation that the user follow a lactose free diet;
examining, by the computing device, current refreshment possibilities and the refreshment target, wherein examining the current refreshment possibilities further comprises:
training a refreshment classifier using second training data, the second training data comprising historical user profile data correlated to historical refreshment descriptions;
generating the refreshment classifier, wherein the refreshment classifier utilizes the current refreshment possibilities as an input, and outputs refreshment descriptions; and
ordering the current refreshment possibilities as a function of the refreshment descriptions and the user profile; and
generating, by the computing device, a refreshment outlook as a function of the current refreshment possibilities and the refreshment target.

10. The method of claim 9 further comprising identifying a refreshment combination preference using the user profile.

11. The method of claim 9, wherein retrieving the user profile further comprises generating a refreshment algorithm, wherein the refreshment algorithm utilizes the user profile as an input, and outputs a refreshment preference.

12. The method of claim 9, wherein identifying current refreshment possibilities further comprises:
receiving an input from a refreshment provider wherein the input identifies current refreshment possibilities; and
identifying the refreshment provider in reference to the refreshment position.

13. The method of claim 9, wherein outputting the refreshment target further comprises:
retrieving an element of user data contained within the user profile; and
generating a target algorithm wherein the target algorithm utilizes the element of user data as an input, and outputs the refreshment target.

14. The method of claim 9, wherein outputting the refreshment target further comprises:
determining a deficiency between the current refreshment possibilities and the refreshment target; and
suggesting a replacement intended to cure the deficiency.

15. The method of claim 9, wherein examining the current refreshment possibilities further comprises:
retrieving a logged refreshment entry contained within the user profile; and
adjusting the refreshment target using the logged refreshment entry.

16. The method of claim 9 further comprising:
receiving a refreshment selection contained within the refreshment outlook from a user client device; and
organizing transmission of the refreshment selection using the user profile.

17. The system of claim 1, wherein:
the user profile further comprises willingness to change data of the user, wherein the willingness to change data contains information describing how willing the user needs to be to change habits and ways of life to comply with a particular refreshment target; and
outputting the refreshment target further comprises inputting the willingness to change data of the user to the machine-learning model and outputting the refreshment target from the machine-learning model.

18. The method of claim 9, wherein:
the user profile further comprises willingness to change data of the user, wherein the willingness to change data contains information describing how willing the user needs to be to change habits and ways of life to comply with a particular refreshment target; and
outputting the refreshment target further comprises inputting the willingness to change data of the user to the machine-learning model and outputting the refreshment target from the machine-learning model.

19. The system of claim 1, wherein the travel preference of the user is based on an ingredient preference of the user and wherein the ingredient preference includes a pesticide free or non-genetically modified ingredient preference.

20. The method of claim 9, wherein the travel preference of the user is based on an ingredient preference of the user and wherein the ingredient preference includes a pesticide free or non-genetically modified ingredient preference.

\* \* \* \* \*